(12) United States Patent
Talbot (10) Patent No.: US 7,721,160 B2
(45) Date of Patent: May 18, 2010

(54) SYSTEM FOR PROTECTING DATA DURING HIGH-SPEED BIDIRECTIONAL COMMUNICATION BETWEEN A MASTER DEVICE AND A SLAVE DEVICE

(75) Inventor: Gerald R. Talbot, Concord, MA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 416 days.

(21) Appl. No.: 11/518,842

(22) Filed: Sep. 11, 2006

(65) Prior Publication Data
US 2008/0126909 A1    May 29, 2008

(51) Int. Cl.
G06F 11/00 (2006.01)
(52) U.S. Cl. ........................................ 714/52
(58) Field of Classification Search ................. 714/52
See application file for complete search history.

(56) References Cited

U.S. PATENT DOCUMENTS

| | | | | |
|---|---|---|---|---|
| 5,283,869 | A * | 2/1994 | Adams et al. | 709/237 |
| 5,455,959 | A * | 10/1995 | Simmering | 710/18 |
| 5,517,626 | A * | 5/1996 | Archer et al. | 710/110 |
| 6,690,667 | B1 * | 2/2004 | Warren | 370/389 |
| 7,358,771 | B1 * | 4/2008 | Talbot | 326/82 |
| 7,505,332 | B1 * | 3/2009 | Talbot | 365/189.09 |
| 7,506,222 | B1 * | 3/2009 | Talbot | 714/707 |
| 7,562,285 | B2 * | 7/2009 | Yang et al. | 714/815 |
| 2002/0083376 | A1 * | 6/2002 | Self et al. | 714/56 |
| 2003/0023918 | A1 * | 1/2003 | Wu | 714/751 |
| 2004/0098655 | A1 * | 5/2004 | Sharma | 714/758 |
| 2007/0208819 | A1 * | 9/2007 | Talbot et al. | 709/208 |

* cited by examiner

*Primary Examiner*—Scott T Baderman
*Assistant Examiner*—Yair Leibovich
(74) *Attorney, Agent, or Firm*—Meyertons, Hood, Kivlin, Kowert & Goetzel, P.C.; Stephen J. Curran (57) ABSTRACT

A system for protecting data during high-speed bidirectional communication between a master device and a slave device. The master device may control data transfer between the master device and the slave device. In addition, the master device may perform a read request to the slave device for a first data block associated with a first address and a second data block associated with a second address. In response, the slave device may send to the master device a portion of the first data block in a first burst and a portion of the second data block in a second burst via a plurality of bidirectional data paths. The slave device may further generate and send to the master device via one or more unidirectional data paths a cyclic redundancy code (CRC) based upon the first data block and the second data block.

23 Claims, 7 Drawing Sheets

|  | 4-bit access | | | 8-bit access | | | | | |
|---|---|---|---|---|---|---|---|---|---|
| bit0 | bit1 | bit2 | bit3 | bit4 | bit5 | bit6 | bit7 | bit8 | bit9 |
|  |  |  |  |  |  |  |  | bit10 | bit11 |
| bit16 | bit17 | bit18 | bit19 | bit20 | bit21 | bit22 | bit23 | bit12 | bit13 |
| bit24 | bit25 | bit26 | bit27 | bit28 | bit29 | bit30 | bit31 | bit14 | bit15 |
| bit32 | bit33 | bit34 | bit35 | bit36 | bit37 | bit38 | bit39 | bit72 | bit73 |
| bit40 | bit41 | bit42 | bit43 | bit44 | bit45 | bit46 | bit47 | bit74 | bit75 |
| bit48 | bit49 | bit50 | bit51 | bit52 | bit53 | bit54 | bit55 | bit76 | bit77 |
| bit56 | bit57 | bit58 | bit59 | bit60 | bit61 | bit62 | bit63 | bit78 | bit79 |
| bit64 | bit65 | bit66 | bit67 | bit68 | bit69 | bit70 | bit71 | crc0 | crc8 |
|  |  |  |  |  |  |  |  | crc1 | crc9 |
| bit80 | bit81 | bit82 | bit83 | bit84 | bit85 | bit86 | bit87 | crc2 | crc10 |
| bit88 | bit89 | bit90 | bit91 | bit92 | bit93 | bit94 | bit95 | crc3 | crc11 |
| bit96 | bit97 | bit98 | bit99 | bit100 | bit101 | bit102 | bit103 | crc4 | crc12 |
| bit104 | bit105 | bit106 | bit107 | bit108 | bit109 | bit110 | bit111 | crc5 | crc13 |
| bit112 | bit113 | bit114 | bit115 | bit116 | bit117 | bit118 | bit119 | crc6 | crc14 |
| bit120 | bit121 | bit122 | bit123 | bit124 | bit125 | bit126 | bit127 | crc7 | crc15 |
| Bidir data paths [0:7] | | | | | | | | CRC [0:1] | |

*FIG. 6A*

|  | 4-bit access | | | 8-bit access | | | | | |
|---|---|---|---|---|---|---|---|---|---|
| bit0 | bit1 | bit2 | bit3 | bit4 | bit5 | bit6 | bit7 |  |  |
| bit8 | bit9 | bit10 | bit11 | bit12 | bit13 | bit14 | bit15 |  |  |
| bit16 | bit17 | bit18 | bit19 | bit20 | bit21 | bit22 | bit23 |  |  |
| bit24 | bit25 | bit26 | bit27 | bit28 | bit29 | bit30 | bit31 |  |  |
| bit32 | bit33 | bit34 | bit35 | bit36 | bit37 | bit38 | bit39 |  |  |
| bit40 | bit41 | bit42 | bit43 | bit44 | bit45 | bit46 | bit47 |  |  |
| bit48 | bit49 | bit50 | bit51 | bit52 | bit53 | bit54 | bit55 |  |  |
| bit56 | bit57 | bit58 | bit59 | bit60 | bit61 | bit62 | bit63 |  |  |
| bit64 | bit65 | bit66 | bit67 | bit68 | bit69 | bit70 | bit71 | crc0 | crc8 |
| bit72 | bit73 | bit74 | bit75 | bit76 | bit77 | bit78 | bit79 | crc1 | crc9 |
| bit80 | bit81 | bit82 | bit83 | bit84 | bit85 | bit86 | bit87 | crc2 | crc10 |
| bit88 | bit89 | bit90 | bit91 | bit92 | bit93 | bit94 | bit95 | crc3 | crc11 |
| bit96 | bit97 | bit98 | bit99 | bit100 | bit101 | bit102 | bit103 | crc4 | crc12 |
| bit104 | bit105 | bit106 | bit107 | bit108 | bit109 | bit110 | bit111 | crc5 | crc13 |
| bit112 | bit113 | bit114 | bit115 | bit116 | bit117 | bit118 | bit119 | crc6 | crc14 |
| bit120 | bit121 | bit122 | bit123 | bit124 | bit125 | bit126 | bit127 | crc7 | crc15 |
| Bidir data paths [0:7] | | | | | | | | CRC [0:1] | |

SYSTEM FOR PROTECTING DATA DURING HIGH-SPEED BIDIRECTIONAL COMMUNICATION BETWEEN A MASTER DEVICE AND A SLAVE DEVICE

BACKGROUND OF THE INVENTION

1. Field of the Invention

This invention relates to communication links and, more particularly, to communication between a master device and a slave device over bidirectional links

2. Description of the Related Art

Many systems employ conventional high-speed bidirectional signaling schemes in which the work of controlling amplitude and phase of the signals sent over a channel may be divided equally between each end of a communication link. In such systems, the control of the link may be symmetric such that the transmitter and the receiver at each end of the link may include very similar functionality.

An example of such a system may be a memory system, where there may be a complex master device (e.g., memory controller) and simpler slave devices (e.g., memory devices). The bidirectional data transfers would correspond to write data when transferring to the slave and read data when transferring from the slave.

To allow transfers to occur at high data rates, a clock phase recovery function may be implemented in the receiver at each end of the bi-directional data bus. For channels with significant high frequency loss or reflections, the channel may be equalized to prevent data eye closure from the effect of intersymbol interference (ISI). In addition, links that have high data transfer rates may have a significant likelihood of bit errors occurring; particularly correlated errors. Thus, a means of error detection is typically implemented. As mentioned above, these functions may be conventionally implemented at both ends of the link. However, it may be desirable to simplify slave devices while maintaining control of the analog properties of the data waveforms that travel in both directions, and while providing a strong error detection capability.

SUMMARY

Various embodiments of a system for protecting data during high-speed bidirectional communication between a master device such as a memory controller, for example, and a slave device such as a memory device, for example, are disclosed. In one embodiment, the master device may be configured to control data transfer between the master device and the slave device. In addition, the master device may perform a read request to the slave device for a first data block associated with a first address and a second data block associated with a second address. In response, the slave device may be configured send to the master device a portion of the first data block in a first burst and a portion of the second data block in a second burst via a plurality of bidirectional data paths. The slave device may be further configured to generate and send to the master device via one or more unidirectional data paths a cyclic redundancy code (CRC) based upon the first data block and the second data block.

In one implementation, the slave device may be further configured to send to the master device via the one or more unidirectional data paths, a remaining portion of the first data block and a remaining portion of the second data block at substantially the same time as the first burst, and prior to sending the CRC to the master device.

In another implementation, the slave device may be further configured to send a same subset of the portion of the first data block two times during the first burst and prior to sending any remaining subsets of the portion of the first data block, and to send a same subset of the portion of the second data block two times during the second burst and prior to sending any remaining subsets of the portion of the second data block.

BRIEF DESCRIPTION OF THE DRAWINGS

FIG. 6A is a diagram depicting the bit positions of the data and CRC bits within their data paths during a read operation in one embodiment of the system of FIG. 1.

FIG. 6B is a diagram depicting the bit positions of the data and CRC bits within their data paths during a write operation in one embodiment of the system of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Figure 1:
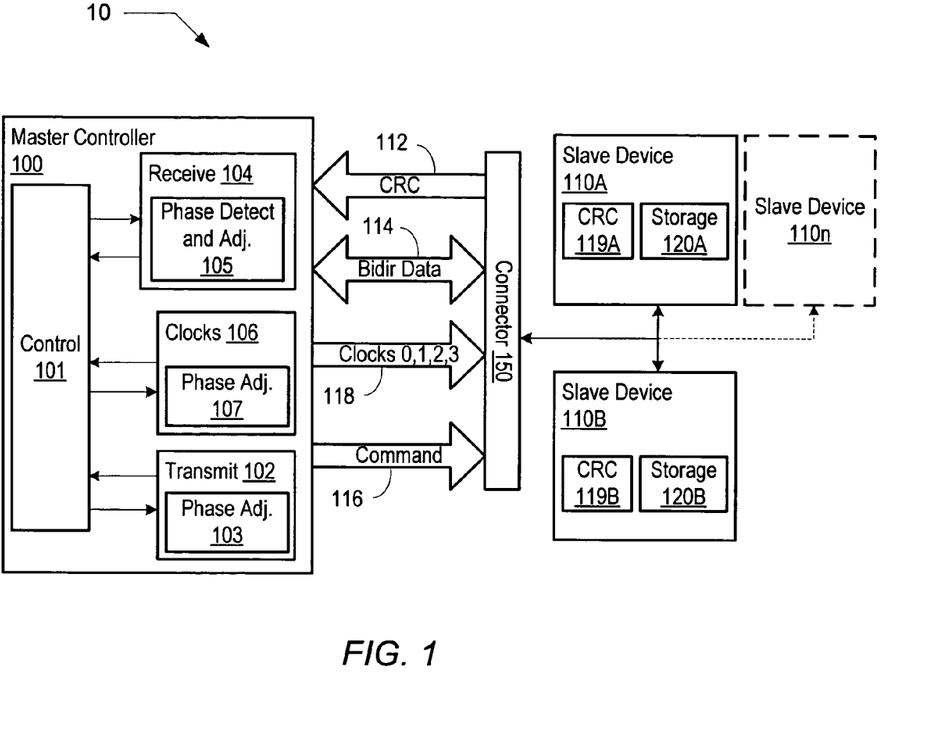
FIG. 1 is a block diagram of one embodiment of a system including asymmetric control of bidirectional data transfer.

Turning now to FIG. 1, a block diagram of one embodiment of a system including asymmetric control of bidirectional data transfer is shown. System 10 includes a master controller 100 coupled to slave devices 110A through 110n via a plurality of signal paths and a connector 150. As shown, the signal paths include bidirectional (bidir) data paths 114, command paths 116, and cyclic redundancy code (CRC) signal paths 112, and clocks 118. It is noted that slave device 110n is meant to illustrate that any number of slave devices may be used. It is also noted that components that include a reference designator having a number and a letter may be referred to by the number only. For example, slave device 110A may be referred to as slave device 110 where appropriate.

Figure 7:
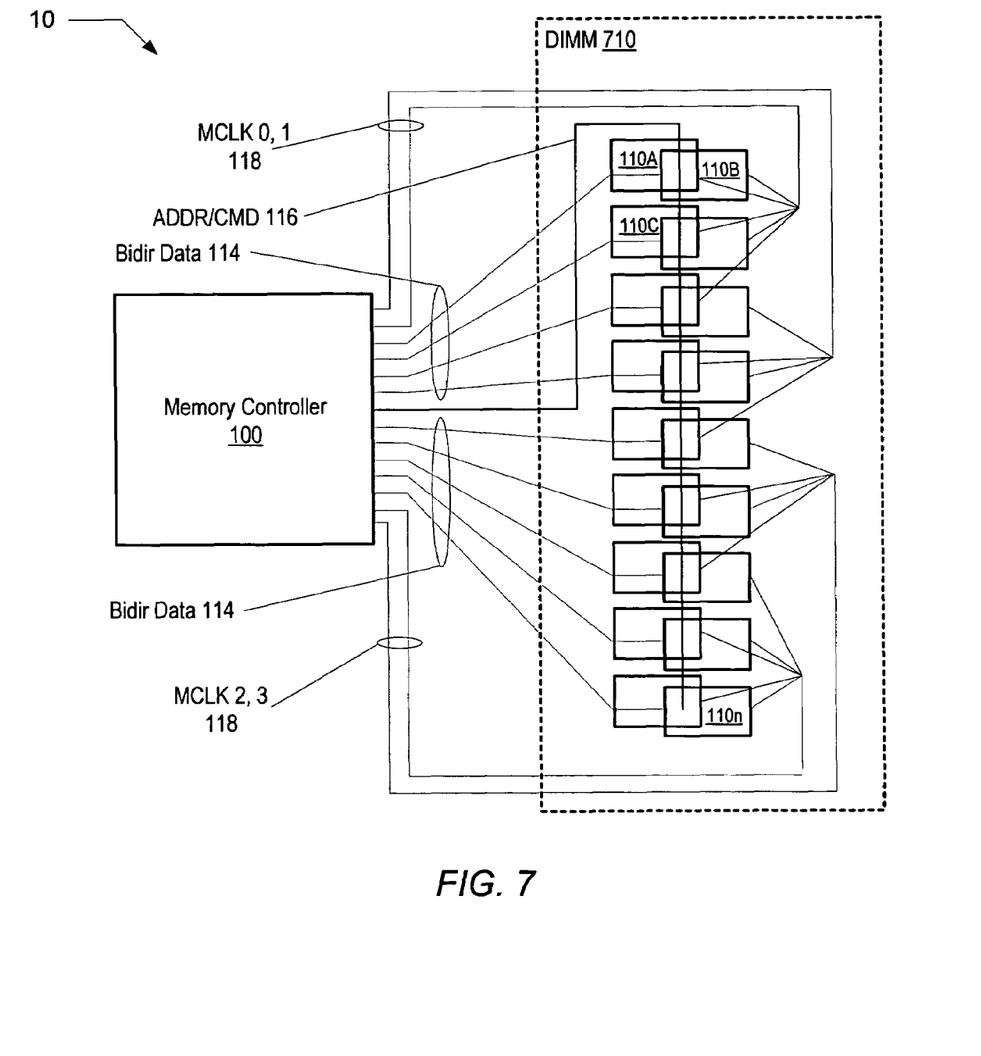
FIG. 7 is a block diagram of a specific embodiment of the system of FIG. 1.

In the illustrated embodiment, master controller 100 includes a control unit 101 that is coupled to a transmit unit 102, a receive unit 104, and a clocks unit 106. In one implementation, system 10 may be an example of a memory subsystem. As such, master controller 100 may be a memory controller and slave devices 110A-110n may be memory devices such as devices in the dynamic random access memory (DRAM) family of memory devices, for example. As such, connector 150 may be a "finger" connector such as may be found on a memory module that includes a plurality of memory devices such as slave devices 110. An exemplary memory subsystem implementation is shown in FIG. 7. However, it is noted that in general, system 10 may be representative of any type of system that employs bidirectional data paths.

In one embodiment, command paths 116 may convey address and control information via single ended signal paths. Bidirectional (Bidir) data paths 114 may convey data in both directions via bidirectional single ended signal paths. The bidirectional data paths 114 may include a number of eight-bit (byte-wide) data paths. For example, the full data path may be 64 bits wide, but the full data path may be divided into byte-sized portions. It is noted that the full data path may include any number of data bits, and be divided into different sized (e.g., 4-bit) portions. CRC paths 112 may convey CRC information and read data from slave 110 to master controller 100 via unidirectional single ended signal paths. In one embodiment, CRC paths 112 may include two signal paths to convey two CRC bits, although any number of signal paths and bits may be used. In addition, clocks paths 118 may convey clock signals 0, 1, 2, and 3 to each of slave deices 110. In one implementation each of the clock signals 0-3 may be conveyed as differential signal pairs.

Figure 2:
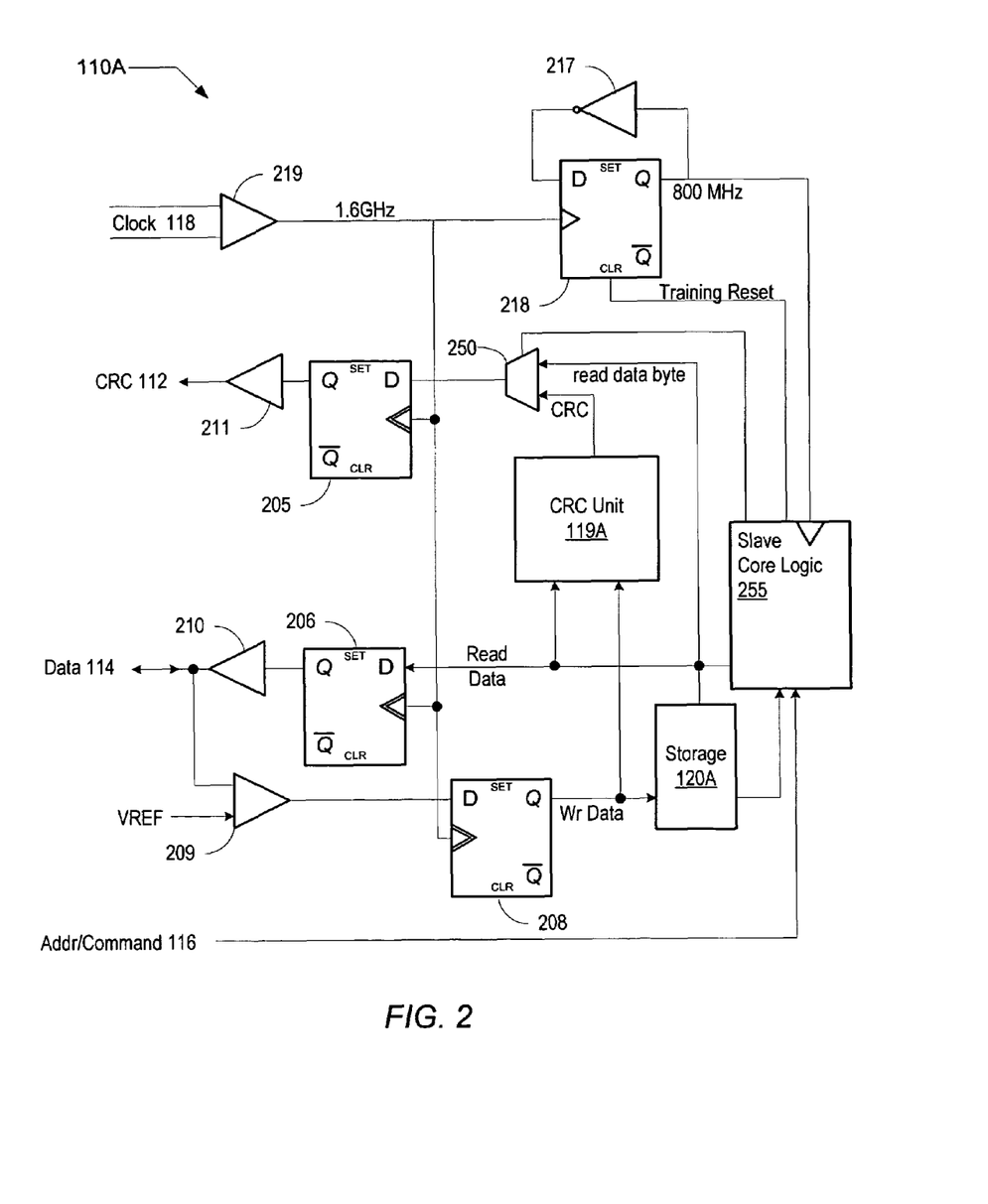
FIG. 2 is a diagram illustrating more detailed aspects of one embodiment of a slave device of FIG. 1.

At high data rates the probability of a slave device 110 or master controller 100 receiving a bit error is significant. Accordingly, it may be necessary to protect transfers with an error detection code that will robustly detect multiple bit errors within a protected block. In one embodiment, a CRC may be used to provide such multiple bit error detection. More particularly, as shown in FIG. 2, to simplify the logic in the slave device and reporting of errors to master controller 100, slave device 110 calculates a CRC based on either the data it is generating or the data that it is receiving. Accordingly, to transfer the CRC information back to master controller 100 one or more unidirectional CRC signal paths 112 may be used. As shown in FIG. 2, CRC generation unit 119A calculates the CRC based on its internal data, and sends the CRC data back to master controller 100. In one embodiment, control unit 101 may also generate a CRC based on the data it is sending and/or receiving. As such, control unit 101 may compare the master CRC with the received slave CRC to determine if an error exists. When an error is detected on the link in either direction, master controller 100 may correct the error by retrying the operation.

As mentioned above the CRC may robustly detect multiple bit errors. In addition, the errors may be highly correlated due to a number of factors including: common launch clock phase jitter, common sample clock phase jitter, similar channel characteristics between lanes in a byte group, and a relatively small number of independent bits are needed to create a worst case ISI scenario and crosstalk jitter. Further, due to block burst and interconnect size constraints within system 10, the CRC is implemented as a 16-bit code. As such, in one embodiment, the CRC robustly detects multiple bit errors in both rows and columns. To produce the desired CRC attributes, CRC units within slave devices 110 (e.g., CRC units 119A, 119B) may be implemented using a variety of well-known CRC generators with a polynomial such as $X^{16}+X^{15}+X^5+X^4+X^3+1$. The CRC generator may be seeded with all ones. When implemented in system 10, this particular polynomial may detect, for example, arbitrary 3-bit errors, an arbitrary number of errors in any row, and arbitrary 9-bit errors in any column. However, it is contemplated that in other embodiments other polynomials may be used to produce similar results.

In one embodiment, the CRC information may be calculated and sent in parallel with the data on a transfer from slave device 110 to master controller 100 so that the CRC may be available at substantially the same time as the data block it is protecting when it reaches master controller 100. As described in greater detail below in conjunction with the description of FIG. 5, delays associated with calculating the CRC, may be mitigated by delays introduced on the data paths during write-to-read, and read-to-write transitions.

As mentioned above, many conventional systems control high-speed bidirectional communication by implementing control functions such as clock phase recovery, channel equalization, error detection, for example, in both communicating devices. However, as described in greater detail below, slave device 110 may be simplified. As such, master controller 100 may include control functionality that may dynamically and adaptively adjust the signal characteristics (e.g., phase, etc.) of transmitted write data to enable slave device 110 to correctly read the data based upon information received from slave device 110. In addition, master controller 100 may adjust its internal receiver characteristics to enable master controller 100 to receive data sent by slave device 110. Further, master controller 100 may adjust the phase of clock signals 118 that are provided to slave device 110 to enable address and command information to be correctly sampled.

More particularly, at high data rates the uncertainties of delays in the transmission path for different signals in a bus may require a per bit phase adjustment of a sample clock of a receiver of those signals. To avoid employing this circuitry in slave device 110, master controller 100 may adjust the phase of its transmitted clock and data signals to avoid complex phase shifting circuits in slave device 110. Thus, control unit 101 may calculate phase information based on data received from slave device 110 that may be used to adjust the phase of various sample clock edges within master controller 100. For example, in response to such information as CRC data and read data, control unit 101 may control phase tracking and adjustment circuits 103, 105, and 107 within transmit unit 102, receive unit 104, and clock unit 106, respectively.

Referring to FIG. 2, a diagram illustrating more detailed aspects of one embodiment of a slave device of FIG. 1 is shown. It is noted that slave device 110A may be representative of any slave device shown in FIG. 1. Slave device 110A of FIG. 3 includes core logic 255 which is coupled to receive address and command signals 116. Slave device 110A also includes a data input buffer 209 that is coupled to receive one signal path of bidir data paths 114 and a VRef signal. The write data output of buffer 209 is coupled to an input of a flip-flop (FF) 208. The output of FF 208 is coupled to an input of CRC unit 119A and to storage 120A. A read data out signal from storage 120A is coupled to an input of FF 206. The output of FF 206 is coupled to a data output buffer 210 which is coupled to the same signal path of bidir data paths 114. The read data out signal is also coupled to an input of CRC unit 119A.

The output of CRC unit 119A is coupled to one input of a two input multiplexer 250. The output of multiplexer 250 is coupled to the input of FF 205. The output of FF 205 is coupled to output buffer 211 is coupled to one signal path of CRC and signal paths 112. The other input to multiplexer 250 is a data byte of the read data. The CRC signal paths may be multiplexed with read data. The multiplexer input select is provided by slave core logic 255. It is noted that although only one signal path and thus one bit of data is shown, depending on the number of data bits that each slave device operates on, there may be any number of data signal paths. For example, in embodiments in which slave device is a DRAM device, there may be four, eight, 16, etc. data path signals to each device.

In the illustrated embodiment, clock 118 is provided to input buffer 219 as a differential signal at 1.6 GHz, although it is contemplated that other frequencies may be used. The output of buffer 219 is a single ended clock signal that is coupled to the clock input of FF 218. The output of FF 218 is coupled back to the input of FF 218 through an inverter 217, thus FF 218 divides the 1.6 GHz clock by two. The 800 MHz output of FF 218 is also used to clock circuits within slave core logic 255. The clear input of FF 218 is coupled to slave core logic 255 and is designated as "training reset." As shown, each of FF 205, FF 206, FF 208, and FF 218 are clocked by the 1.6 GHz clock. Further, FF 205, FF 206, and FF 208 are shown as dual edge flip flops, meaning they are configured to latch the 'D' input on both the leading and trailing edge of the input clock signal. Accordingly, read data, write data, and CRC information may be conveyed at 3.2 GHz on their respective data paths.

In one embodiment, when write data is received, it is latched by FF 208 and stored to storage 120A. In various embodiments, storage 120A may represent any type of storage that may store data. For example, in one implementation, storage 120A may include a memory storage array arranged in rows and columns including corresponding sense amplifiers such as may be found in a typical DRAM device. The particular rows and columns of the storage array may be accessed based upon the address and commands received on address command signal paths 116. In addition, storage 120A may include one or more independently accessible registers that may also be accessed based upon the address and commands received on address command signal paths 116.

As mentioned above, CRC information is transmitted from slave device 110 to master controller 100 via multiplexer 250. As shown in FIG. 2 and described in greater detail below, the CRC signal paths 112 may convey a byte of data during portions of the read data cycle. More particularly, in one embodiment, two CRC signal paths may protect 8 data paths. On a transfer from slave device 110 to master controller 100, the correctness of the data in the block may not be established until all of the data block and the CRC have been received. However, this increases the latency for the first portion of the block which might be a critical word for forward progress in the system.

Accordingly, in one embodiment, the critical word may be additionally protected by including additional in-line error information that is inserted between the critical word and the rest of the block. For example, in one embodiment, the additional error detection information may be implemented by repeating the critical word (e.g., byte 0) at the beginning of the read data block. By sending the critical word twice, master controller 100 may validate that each bit is identical between the two copies and substantially lower the error rate for the critical word, thus allowing the critical word to be treated as valid before the complete CRC for the block has been received. Said in another way, during a read operation, slave device 110 may send the critical word during the first two beats or bit times of the read block. In one embodiment, to allow room for two copies of the critical first data word, one of the data bytes (e.g., data byte 3) may be output on the CRC paths during the first four beats of a read block. It is noted that to get adequate error coverage from the CRC while minimizing impact on bus efficiency, the data may be grouped in blocks over which the CRC is calculated. More particularly, as described further below, the 16-bit CRC may protect two bursts of eight bytes, where each burst of eight bytes corresponds to a different address within slave device 110.

In one embodiment, to enable master controller 100 to accurately receive data sent by slave device 110, and to send data that slave device 110 can accurately receive, during operation master controller 100 may dynamically and adaptively adjust the signal characteristics (e.g., phase, etc.) of transmitted write data and its internal receiver characteristics, and adjust the phase of clock signals 118 that are provided to slave device 110. More particularly, as mentioned above, receive unit 104 includes sample clock phase detection adjustment circuits 105, which may include a bang-bang phase detector (not shown). As such, whenever master controller 100 is receiving data from slave device 110, receive unit 104 may use the bang-bang phase detector to adjust its own local sample clock phase to more optimally receive data transmitted by slave device 110. In addition, master controller 100 includes clock phase adjustment logic 107 that may be used to adjust the phase of each clock signal 120. During an initialization process such as during a power-on reset, for example, master controller 100 may adjust the phase of each clock signal 118 which clocks FF 218, thereby enabling each slave device to correctly sample address and command signals 116. Further, master controller 100 includes transmit data phase adjustment logic 103 which may be used to adjust the phase of the write data transmitted to slave device 110A. During initialization and during operation at predetermined intervals, master controller 100 may adjust the transmitted data phase to enable slave device 110A to more optimally receive the write data.

Figure 3:
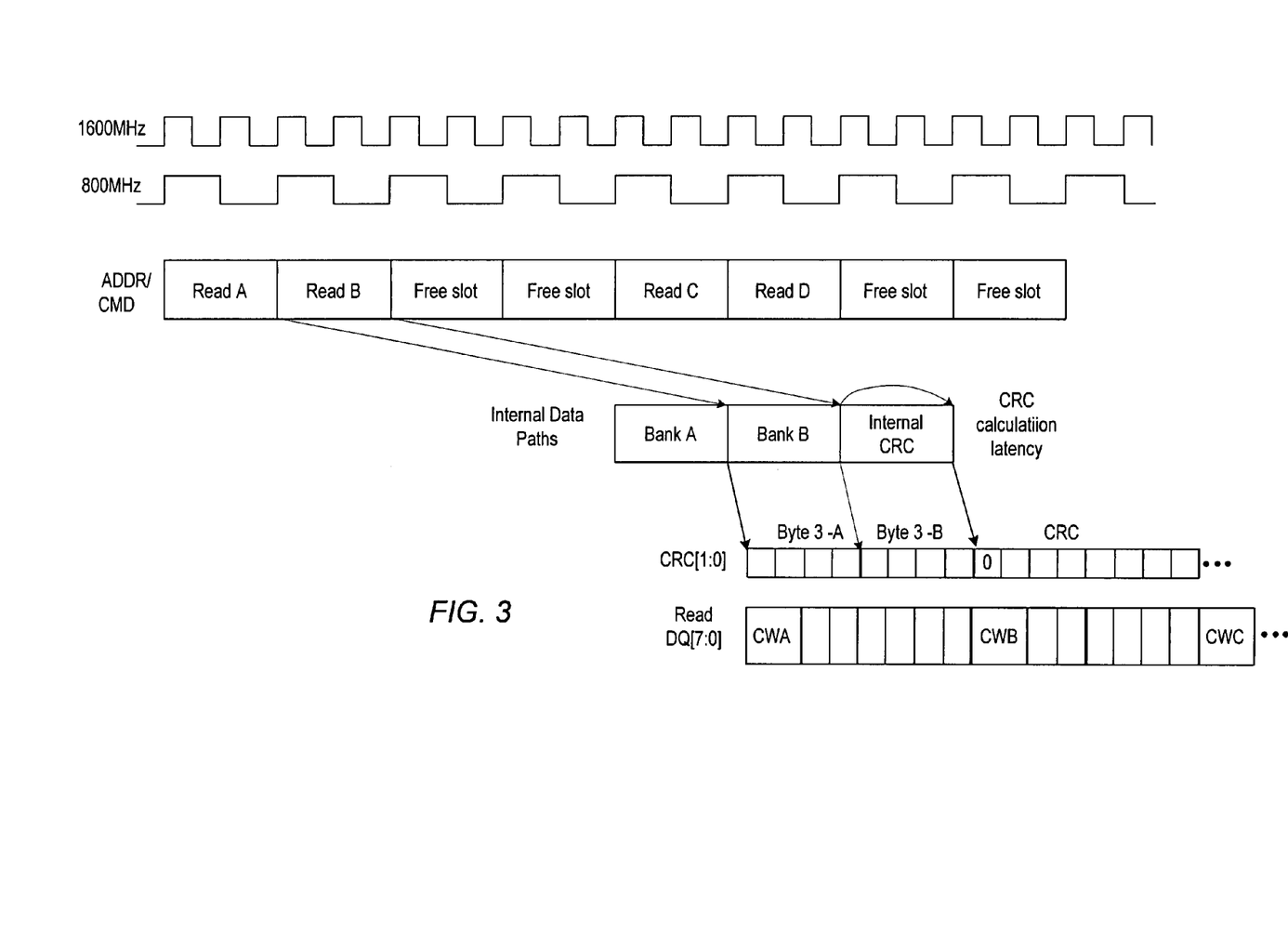
FIG. 3 is timing diagram illustrating the read operation timing of one embodiment of the system of FIG. 1

FIG. 3 is a timing diagram illustrating the operation of the embodiments shown in FIG. 1 and FIG. 2 during a read operation. As shown in FIG. 3, the 1.6 GHz master clock signal and the 800 MHz slave device internal clock signal are shown for reference. In addition, the address/command bus operations and their relationship to the internal data paths of slave device 110 are shown. Further, the CRC paths 112 and the Bidir data paths 114 are shown as CRC [1:0] and Read DQ [7:0], respectively.

Referring collectively to FIG. 1 through FIG. 3, master controller 100 has issued a number of read commands on the address/command signal paths 116. As shown, the read commands are issued in back-to-back pairs with two free bus slots between read pairs. The free slots may correspond to the time needed by the slave device to be ready to perform another read operation, and they may also me used to send other commands that may not initiate data transfers such as bank open, bank close, and the like. Each of the read operations in a read pair is to a different address. More particularly, the first read in the read pair is to bank A and the second read in the read pair is to bank B. Likewise, the first read in the second read pair is to bank C and the second read in the second read pair is to bank D. It is noted that in embodiments in which slave device 110 is a DRAM device, banks A, B, C, and D may refer to different internal memory banks within the DRAM.

In general, there may be some internal delay associated with accessing the data in the banks once the address/commands are latched within the device. Accordingly, from the right end of the block designated Read A, an arrow points to the right end of the Bank A block depicting the data being ready. The same would be true for Banks B, C, and D. When the data from both banks A and B are available, CRC unit 119 begins calculating the CRC as depicted by the block designated Internal CRC. the CRC calculation latency refers to the latency associated with the CRC reaching the CRC pins.

As described above, in one embodiment, the data blocks read from banks A and B are 8-bit wide bytes, and 8-bytes long. The data is sent in two 8-byte bursts on the Bidir data paths 114. The first burst is represented by bit times 0-7, and the second burst is represented by bit times 8-15. To mitigate the delay in calculating the CRC, the first byte (referred to above as the critical word) of the data from bank A is placed on the Bidir data paths 114 (e.g., Read data [7:0]) prior to the CRC being calculated. This first byte is repeated. This is depicted in FIG. 3 as CWA and uses two bit times. Of the remaining seven bytes of the bank A data, six bytes are sent via the Bidir data paths 114 during bit times 2-7. However, as described above, one of the displaced remaining data bytes is sent on the CRC signal paths 112 (e.g., CRC [1:0]). In the illustrated embodiment, data byte 3 is sent two bits at a time, using bit times zero-three. As shown, data byte 3 for bank A is followed immediately by data byte 3 for bank B. Thus, all of the bank A data, and byte 3 of bank B is sent during the first burst, while the CRC is being calculated. The remaining seven bytes of bank B data are sent in the next 8-byte burst, beginning with CWB. Once the CRC is calculated for the bank A and bank B data, the CRC is sent to master controller 100 two bits at a time on the CRC signal paths 112 (e.g., CRC [1:0]) at substantially the same time as the bank B data is sent.

Figure 4:
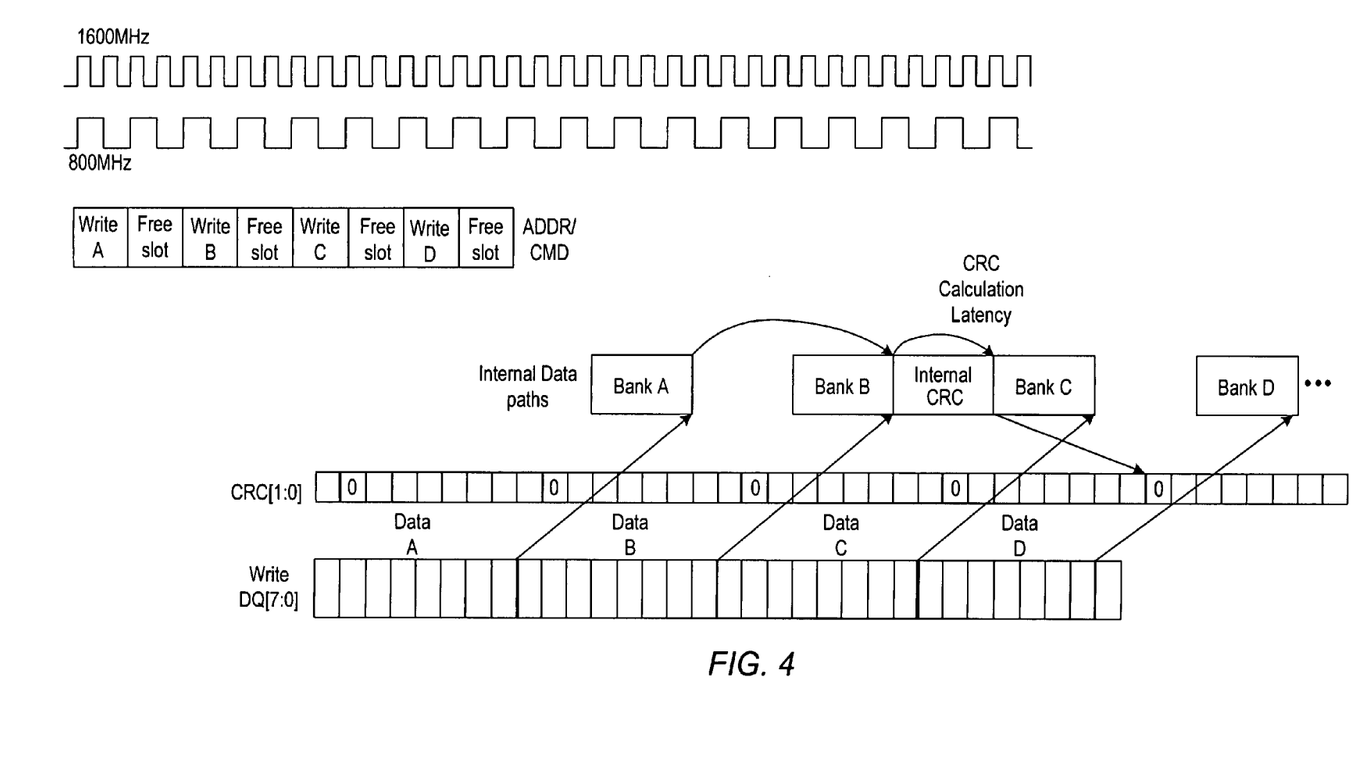
FIG. 4 is timing diagram illustrating the write operation timing of one embodiment of the system of FIG. 1.

FIG. 4 is a timing diagram depicting the operation of the embodiments shown in FIG. 1 and FIG. 2 during a write operation. Referring collectively to FIG. 1, FIG. 2, and FIG. 4, master controller 100 issues write commands to banks A, B, C, and D of a slave device 110. In FIG. 4, the 1.6 GHz and 800 MHz clock signals are shown for reference. The write commands are issued on the Address/Command signal paths 116 in a sequence beginning with Write A, followed by a Free Slot, Write B, Free slot, and so on. Accordingly, the write data is sent on the Bidir data signal paths 114, and depicted as Write DQ [7:0] in FIG. 4. The write data for the four banks is sent back-to-back in 8-byte bursts. Arrows at the end of the write data A, write data B, write data C, and write data D point to the right side of the blocks labeled Bank A, bank B, Bank C, and Bank D, respectively. This illustrates the data being available internally to slave device 110. In addition, as shown, the Bank A and Bank B data are available for CRC unit 119 to calculate the CRC. After a CRC calculation latency the CRC covering both banks A and B is sent to master controller 100 two bits at a time on the CRC signal paths 112 (e.g., CRC [1:0]). The operation for bank C and bank D write data is similar. For example, when the write data for both bank C and bank D is available internally, CRC unit 119 may begin calculating the CRC for both banks C and D. After the internal CRC calculation delay, the CRC may be sent to master controller 100.

As mentioned above, master controller 100 may compare the CRC received from slave device 110 with the CRC that control unit 101 calculated to determine whether there was an error or errors detected in the transmission. If it is determined that an error was present, master controller 100 may resend the write data.

Figure 5:
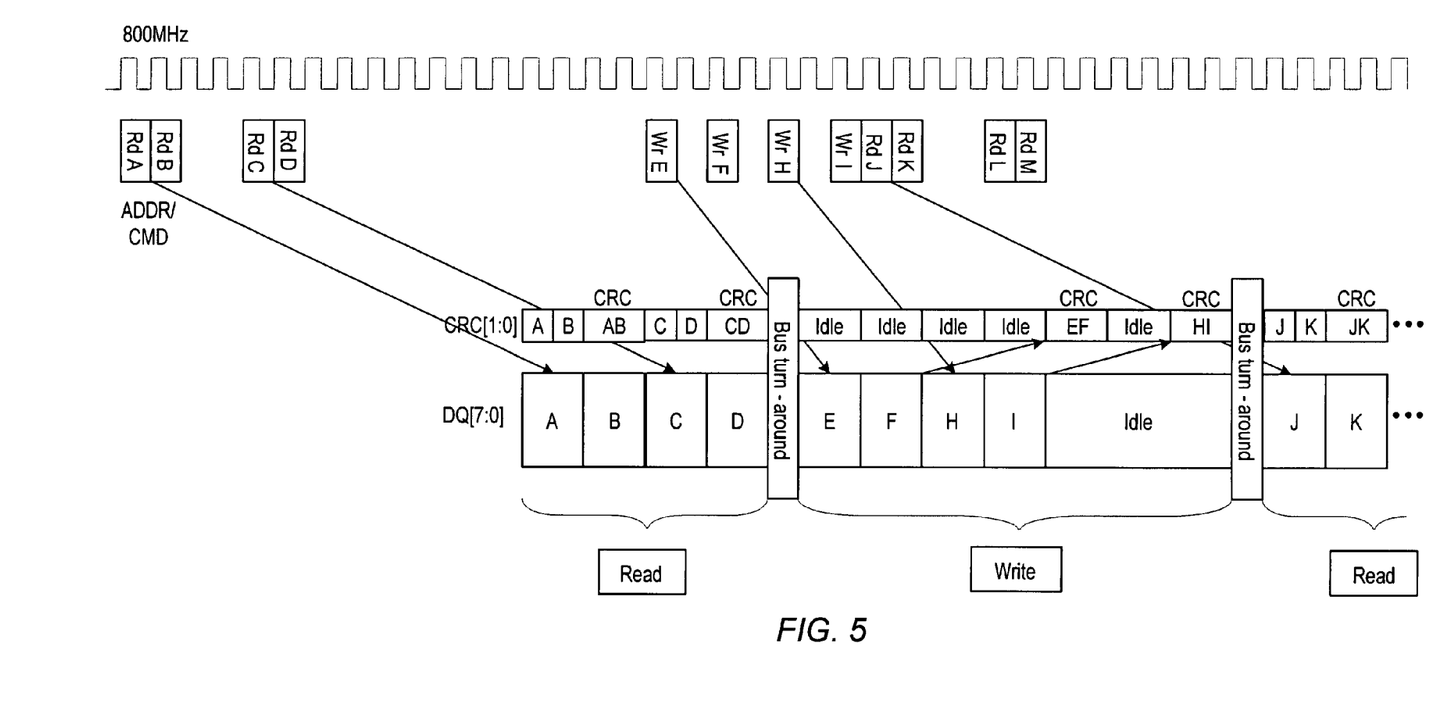
FIG. 5 is timing diagram illustrating the timing during read-write-read operations of one embodiment of the system of FIG. 1.

As mentioned above in the description of FIG. 1, delays associated with calculating the CRC may be mitigated by delays that are necessarily introduced on the data paths during write-to-read, and read-to-write transitions. In FIG. 5, a timing diagram depicting the operation of the embodiments shown in FIG. 1 and FIG. 2 during a read-write-read operation is shown.

Referring collectively to FIG. 1 through FIG. 5, master controller 100 issues read commands for banks A, B, C, and D followed by write commands to banks E, F, H, and I, followed by read commands for banks J, K, L, and M of a slave device 110. In FIG. 5, the slave device 800 MHz internal clock signal is shown for reference. The read and write commands are shown on the Address/Command signal paths 116. More particularly, as described above and shown in FIG. 4, there are reads to banks A and B, followed by two free slots, followed by reads to banks C and D. Several cycles later, master controller 100 issues four write commands to banks E, F, H, and I. Each of the write commands is separated by a free slot. The next cycle after the write command to bank I, master controller 100 begins issuing read commands to banks J, K, L, and M similar to the read commands of A, B, C, and D.

The read operation shown in FIG. 5 is similar to the read operation shown in FIG. 3. For example, as shown by the arrow from the Rd A block in FIG. 5, the bank A data is shown being sent in a first burst on the Bidir data signal paths 114 (e.g., DQ [7:0]), followed immediately by the bank B data in a second burst. In addition, at substantially the same time as the first burst, the bank A byte 3 data is output on the CRC signal paths 112 (e.g., CRC [1:0]), followed immediately by the bank B byte 3 data. When the bank A and bank B data is available, CRC unit 119 calculates the CRC for bank A and bank B (e.g., AB) and, as shown, outputs the (AB) CRC on the CRC signal paths 112 (e.g., CRC [1:0] immediately following the bank B byte 3 data. Operation is similar for the read operation to banks C and D.

For the write operation, master controller 100 has issued the write commands, but the write data isn't put on the Bidir data signal paths 114 until after the bus-turnaround delay. This delay may correspond to the time taken to switch the bidirectional drivers used to drive the data onto the device bidirectional data pins. Accordingly, the write data E is on the Bidir data signal paths 114 after the bus turn-around delay. The write operation is similar to the write operation shown in FIG. 4. For example, the write data for banks E, F, H, and I is sent in back-to-back in 8-byte bursts. In addition, the (EF) CRC is output when CRC unit 119 is finished calculating the (EF) CRC. Likewise for the (HI) CRC. As shown, the write data pins (e.g., DQ [7:0]) are idle from the end of the I write data block to the bus turn-around. This idle time may correspond directly with the internal CRC latency in calculating the CRC and getting the CRC to the slave device pins. It is noted that this idle time may also be required by some slave devices to internally switch from write to read.

After the second bus turn-around, the Bidir data signal paths 114 are ready to convey read data. As such, the read data for banks J, K, L, and M may be output on the Bidir data signal paths 114 (e.g., DQ [7:0]). At substantially the same time as the read data being output, the byte 3 data for banks J and K, and the (JK) CRC are output on the CRC signal paths 112 (e.g., CRC [1:0]) as described above.

FIG. 6A and FIG. 6B are diagrams depicting the bit positions of the data and CRC bits within their data paths during a read operation and a write operation, respectively, in one embodiment of the system of FIG. 1. As described above, the CRC unit 119 may generate a CRC that provides robust multi-bit error detection using a CRC polynomial such as $X^{16}+X^{15}+X^5+X^4+X^3+1$, for example. For this polynomial to generate a CRC that provides the robust error detection properties, the data and CRC bits may be positioned as shown in FIG. 6A for read operations, and as shown in FIG. 6B for write operations.

Referring to FIG. 6A, the diagram includes rows and columns. The rows depict beats or bit times, while the columns represent individual data or CRC signal paths. More particularly, beginning at the far left, the first eight columns represent data bit signal paths [0:7] of Bidir data signal paths 114, and the last two columns represent the CRC signal paths [0:1] of CRC signal paths 112. As mentioned above, in various embodiments, the data paths to each slave device 110 may be four, eight, or 16 bits, depending on the specific implementation. As such, FIG. 6A depicts the bit positions for 4 and 8-bit accesses. Accordingly, for 4-bit accesses, only the first four data columns and the two CRC columns are used, as depicted by the thick black vertical line between bit3 and bit4.

In the illustrated embodiment, the dark horizontal line below bit56 and running the entire width represents the separation of a first read data block and a second read data block. For example, in the embodiments shown in FIG. 3 through FIG. 5, this may represent read data from bank A and bank B. Similarly for the CRC signal paths, the thick black line below bit 14 and bit 15 represents the separation of data for the displaced data bytes (e.g., byte 3) from the two different banks.

Referring to FIG. 6B, the diagram is similar to the diagram of FIG. 6A. However, since FIG. 6B depicts write operations, no read data is output on the CRC signal paths because all write data is conveyed upon the Bidir data signal paths 114. The dark horizontal line below bit 56 and running the entire width represents the separation of a first read data block and a second read data block.

FIG. 7 is a diagram depicting one implementation of the system shown in FIG. 1. In FIG. 7, system 10 is a memory subsystem including a memory controller 100 coupled to a dual in-line memory module (DIMM) 710. Thus, memory controller 100 is representative of the master controller 100 shown in FIG. 1 and DIMM 710 includes multiple DRAM devices 110A that are representative of slave devices 110 in FIG. 1.

In the illustrated embodiment, the clock signals 120 of FIG. 1 are depicted as MCLK 0-MCLK 3. In addition, as described above, the MCLK 1 is coupled to the first five DRAM devices 110 and MCLK 0 is coupled to the next four DRAM devices 110. Similarly, MCLK 2 and MCLK 3 are coupled to the next five and four DRAM devices. In the illustrated embodiment, the address/command 116 signal paths are coupled to the DRAM devices 110 in parallel, but from one end of DIMM 710 to the other. Thus this particular routing of the address/command signals causes signal skew from DRAM device to DRAM device, particularly the further apart they are. As described above, each clock that is provided to a group of DRAM devices 110 may be phase adjusted independently of each other clock.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a slave device; and
a master device coupled to the slave device and configured to control data transfer between the master device and the slave device;
wherein the master device is configured to perform a read request to the slave device for a first data block associated with a first address and a second data block associated with a second address, wherein each of the first data block and the second data block includes a first portion and a second portion that is distinct from the first portion;
wherein the slave device is configured send to the master device the first portion of the first data block in a first burst and the first portion of the second data block in a second burst via a plurality of bidirectional data paths;
wherein the slave device is further configured to send a subset of the first portion of the first data block two times during the first burst and prior to sending a remaining subset of the first portion of the first data block, and to send a subset of the first portion of the second data block two times during the second burst and prior to sending a remaining subset of the first portion of the second data block, wherein a given remaining subset of a data block is distinct from a corresponding subset of a same data block; and
wherein the slave device is further configured to generate and send to the master device, via one or more unidirectional data paths that are separate from the bidirectional data paths, a cyclic redundancy code (CRC) based upon the first data block and the second data block.

2. The system as recited in claim 1, wherein the slave device is further configured to send to the master device, at substantially the same time as the first burst, and prior to sending the CRC to the master device via the one or more unidirectional data paths, the second portion of the first data block that was not sent via the bidirectional data paths, and the second portion of the second data block that was not sent via the bidirectional data paths.

3. The system as recited in claim 1, wherein the subset of the first portion of the first data block comprises a critical first byte of the first portion of the first data block, and the remaining subset of the first portion of the first data block comprises remaining data bytes of the first portion of the first data block, and wherein the subset of the second portion of the second data block comprises a critical first byte of the first portion of the second data block, and the remaining subset of the first portion of the second data block comprises remaining data bytes of the first portion of the second data block.

4. The system as recited in claim 1, wherein the master device is configured to compare the subset of the first portion of the first data block that was sent two times to determine if an error is present, prior to receiving the CRC from the slave device.

5. The system as recited in claim 4, wherein the master device is configured to generate a second CRC based upon the first data block and the second data block, and to compare the second CRC to the CRC sent by the slave device to determine whether an error is present in the first data block and the second data block.

6. The system as recited in claim 2, wherein the slave device is further configured to send the second burst subsequent to sending the first burst.

7. The system as recited in claim 2, wherein the slave device is further configured to send the second portion of the second data block subsequent to sending the second portion of the first data block.

8. The system as recited in claim 1, wherein the master device is further configured to write to the slave device via the plurality of bidirectional data paths a third data block associated with a third address in a third burst and a fourth data block associated with a fourth address in a fourth burst.

9. The system as recited in claim 8, wherein the slave device is configured to generate and send to the master device via the one or more unidirectional data paths a second CRC based upon the third block of data and the fourth block of data.

10. The system as recited in claim 1, wherein the CRC is a 16-bit code generated from a polynomial having the form $X^{16}+X^{15}+X^5+X^4+X^3+1$.

11. A method comprising:
a master device controlling data transfer between the master device and a slave device;
the master device performing a read request to the slave device for a first data block associated with a first address and a second data block associated with a second address, wherein each of the first data block and the second data block includes a first portion and a second portion that is distinct from the first portion;
the slave device sending to the master device the first portion of the first data block in a first burst and the first portion of the second data block in a second burst via a plurality of bidirectional data paths;

the slave device sending to the master device a subset of the first portion of the first data block two times during the first burst and prior to sending a remaining subset of the first portion of the first data block, and to send a subset of the first portion of the second data block two times during the second burst and prior to sending a remaining subset of the first portion of the second data block, wherein a given remaining subset of a data block is distinct from a corresponding subset of a same data block; and the slave device generating and sending to the master device via one or more unidirectional data paths that are separate from the bidirectional data paths, a cyclic redundancy code (CRC) based upon the first data block and the second data block.

12. The method as recited in claim 11, further comprising the slave device sending to the master device, at substantially the same time as the first burst, and prior to sending the CRC to the master device via the one or more unidirectional data paths, the second portion of the first data block that was not sent via the bidirectional data paths, and the second portion of the second data block that was not sent via the bidirectional data paths.

13. The method as recited in claim 11, wherein the subset of the first portion of the first data block comprises a critical first byte of the first portion of the first data block, and the remaining subset of the first portion of the first data block comprises remaining data bytes of the first portion of the first data block, and wherein the subset of the second portion of the second data block comprises a critical first byte of the first portion of the second data block, and the remaining subset of the first portion of the second data block comprises remaining data bytes of the first portion of the second data block.

14. The method as recited in claim 11, further comprising the master device comparing the subset of the first portion of the first data block that was sent two times to determine if an error is present, prior to receiving the CRC from the slave device.

15. The method as recited in claim 14, further comprising the master device generating a second CRC based upon the first data block and the second data block, and comparing the second CRC to the CRC sent by the slave device and determining whether an error is present in the first data block and the second data block.

16. The method as recited in claim 12, further comprising the slave device sending the second burst subsequent to sending the first burst.

17. The method as recited in claim 12, further comprising the slave device sending the second portion of the second data block subsequent to sending the second portion of the first data block.

18. The method as recited in claim 11, further comprising the master device writing to the slave device via the plurality of bidirectional data paths a third data block associated with a third address in a third burst and a fourth data block associated with a fourth address in a fourth burst.

19. The method as recited in claim 18, further comprising the slave device generating and sending to the master device via the one or more unidirectional data paths a second CRC based upon the third block of data and the fourth block of data.

20. The method as recited in claim 11, wherein the CRC is a 16-bit code generated from a polynomial having the form $X^{16}+X^{15}+X^5+X^4+X^3+1$.

21. A memory subsystem comprising:
a memory device including data storage; and
a memory controller coupled to the memory device and configured to control data transfer between the memory controller and the memory device;

wherein the memory controller is configured to perform a read request to the memory device for a first data block associated with a first address and a second data block associated with a second address, wherein each of the first data block and the second data block includes a first portion and a second portion that is distinct from the first portion;

wherein the memory device is configured send to the memory controller the first portion of the first data block in a first burst and the first portion of the second data block in a second burst via a plurality of bidirectional data paths;

wherein the memory device is further configured to send a subset of the first portion of the first data block two times during the first burst and prior to sending a remaining subset of the first portion of the first data block, and to send a subset of the first portion of the second data block two times during the second burst and prior to sending a remaining subset of the first portion of the second data block, wherein a given remaining subset of a data block is distinct from a corresponding subset of a same data block; and wherein the memory device is further configured to generate and send to the memory controller via one or more unidirectional data paths that are separate from the bidirectional data paths, a cyclic redundancy code (CRC) based upon the first data block and the second data block.

22. The memory subsystem as recited in claim 21, wherein the memory device is further configured to send to the memory controller, at substantially the same time as the first burst, and prior to sending the CRC to the master device via the one or more unidirectional data paths, the second portion of the first data block that was not sent via the bidirectional data paths, and the second portion of the second data block that was not sent via the bidirectional data paths.

23. The memory subsystem as recited in claim 22, wherein the subset of the first portion of the first data block comprises a critical first byte of the first portion of the first data block, and the remaining subset of the first portion of the first data block comprises remaining data bytes of the first portion of the first data block, and wherein the subset of the second portion of the second data block comprises a critical first byte of the first portion of the second data block, and the remaining subset of the first portion of the second data block comprises remaining data bytes of the first portion of the second data block.

* * * * *